No. 840,762. PATENTED JAN. 8, 1907.
P. F. GAENZLE.
COOKING UTENSIL COVER.
APPLICATION FILED MAY 14, 1906.

Paul F. Gaenzle, Inventor

UNITED STATES PATENT OFFICE.

PAUL F. GAENZLE, OF READING, PENNSYLVANIA, ASSIGNOR TO GAENZLE, REGENFUSE & COMPANY, OF READING, PENNSYLVANIA, A FIRM.

COOKING-UTENSIL COVER.

No. 840,762.      Specification of Letters Patent.      Patented Jan. 8, 1907.

Application filed March 14, 1906. Serial No. 316,642.

*To all whom it may concern:*

Be it known that I, PAUL F. GAENZLE, a citizen of the United States, residing at Reading, in the county of Berks and State of Pennsylvania, have invented new and useful Improvements in Cooking-Utensil Covers, of which the following is a specification.

This invention relates to improvements in cooking-utensil covers, and my device is intended more particularly for use on frying-pans and skillets.

The object of the device is to provide a cover that will properly protect the contents of the pan and at the same time one that will permit the escape of vapor therefrom.

The objection to tight-fitting covers has been that they produce a baking effect on the contents of the pan, and I overcome this objection with my present invention.

The device consists of a single piece of sheet metal having pressed therein a circular depression and also a series of radiating depressions, the latter adapted to rest on the edge of the pan and allow a space between it and the cover through which the vapor may escape.

My invention is more fully described in the following specification and clearly illustrated in the accompanying drawings, in which—

Figure 1:
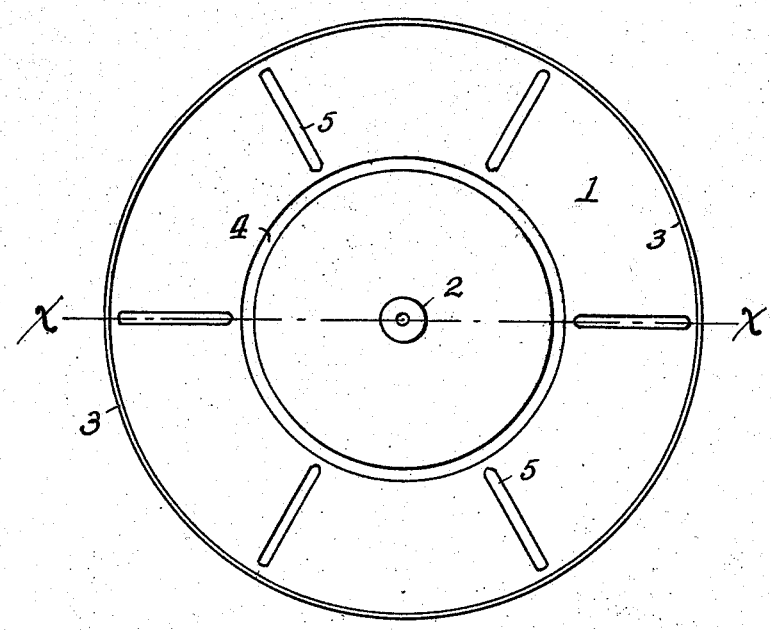
Figure 2:
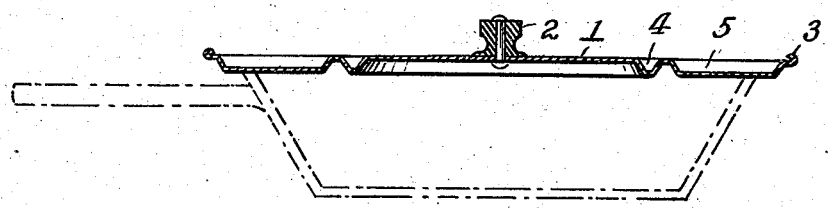

Figure 1 is a plan view of my cover. Fig. 2 is a central sectional view thereof, taken on line X X of Fig. 1.

The numeral 1 designates the body of the cover. This is made of thin sheet metal of any desired quality, and it is provided with the usual centrally-disposed knob or handle 2. The cover is circular in form, and its periphery is upset to form a circumferential bead 3.

At a point approximately midway between the center and the periphery I form a circular depression 4 in the body of the cover. This depression tends to arrest the flow of condensed vapor that will gather on the under side of the cover, and it will drop therefrom into the pan instead of finding its way to the outer edge and onto the stove-top. I also form a series of radiating depressions 5 between this circular depression and the periphery. These depressions do not extend the entir edistance between said points, but allow a small portion of the body to remain flat between their inner ends and the circular depression and also between their outer ends and the edge of the cover. This is done to prevent the condensed vapor finding its way from the circular depression to the outer edge.

It is evident that my device will fit various sizes of pans and that its contour may be varied to suit the shape of the pan on which it is to be used.

Having thus fully described my invention, what I claim, and desire to secure by Letters Patent, is—

A cover for frying-pans consisting of a flat circular plate of sheet metal, an upturned bead formed on the periphery thereof, a circular depression midway between the center and the periphery thereof, a series of radiating depressions extending from a point near the outer edge of said circular depression to a point near the periphery of the cover, and a centrally-disposed knob.

In testimony whereof I affix my signature in presence of two subscribing witnesses.

PAUL F. GAENZLE.

Witnesses:
    ED. A. KELLY,
    M. C. KREIDER.